United States Patent
Hall

(10) Patent No.: US 9,211,528 B2
(45) Date of Patent: Dec. 15, 2015

(54) REJUVENABLE CERAMIC EXHIBITING INTRAGRANULAR POROSITY

(71) Applicant: Michelene Hall, Alfred, NY (US)

(72) Inventor: Michelene Hall, Alfred, NY (US)

(*) Notice: Subject to any disclaimer, the term of this patent is extended or adjusted under 35 U.S.C. 154(b) by 35 days.

(21) Appl. No.: 14/269,760

(22) Filed: May 5, 2014

(65) Prior Publication Data

US 2014/0243193 A1 Aug. 28, 2014

Related U.S. Application Data

(63) Continuation-in-part of application No. 13/341,972, filed on Dec. 31, 2011, now abandoned.

(51) Int. Cl.
| | |
|---|---|
| *B01J 23/889* | (2006.01) |
| *B01J 23/78* | (2006.01) |
| *B01J 23/00* | (2006.01) |
| *B01J 23/80* | (2006.01) |
| *B01J 23/887* | (2006.01) |
| *B01J 35/00* | (2006.01) |
| *B82Y 30/00* | (2011.01) |
| *B01J 23/70* | (2006.01) |
| *C01B 3/40* | (2006.01) |
| *C01B 3/26* | (2006.01) |
| *B01J 37/18* | (2006.01) |
| *B01J 37/12* | (2006.01) |
| *B01J 23/94* | (2006.01) |
| *B01J 23/06* | (2006.01) |
| *B01J 23/86* | (2006.01) |
| *B01J 35/10* | (2006.01) |

(52) U.S. Cl.
CPC ............ *B01J 23/8892* (2013.01); *B01J 23/005* (2013.01); *B01J 23/70* (2013.01); *B01J 23/78* (2013.01); *B01J 23/80* (2013.01); *B01J 23/8878* (2013.01); *B01J 35/002* (2013.01); *B01J 35/006* (2013.01); *B01J 35/008* (2013.01); *B82Y 30/00* (2013.01); *C01B 3/26* (2013.01); *C01B 3/40* (2013.01); *B01J 23/06* (2013.01); *B01J 23/86* (2013.01); *B01J 23/94* (2013.01); *B01J 35/10* (2013.01); *B01J 37/12* (2013.01); *B01J 37/18* (2013.01)

(58) Field of Classification Search
CPC ....... B01J 23/78; B01J 23/005; B01J 23/8892
See application file for complete search history.

(56) References Cited

U.S. PATENT DOCUMENTS

| | | | | |
|---|---|---|---|---|
| 3,973,977 | A * | 8/1976 | Wilson | 501/120 |
| 4,220,560 | A * | 9/1980 | Anquetil et al. | 502/306 |
| 4,540,563 | A * | 9/1985 | Chinchen | 423/656 |

* cited by examiner

*Primary Examiner* — Timothy Vanoy
(74) *Attorney, Agent, or Firm* — C. John Brannon; Brannon Sowers & Cracraft

(57) ABSTRACT

A cermet catalyst material, including a spinel matrix defining a spinel grain and a plurality metal particles embedded in and on the surface of the spinel grain. When the spinel grain is in a first oxidizing atmosphere and at a temperature above about 800 degrees Celsius the metal particles are absorbed into the spinel matrix in the form of metal cations. When the grain is in an second, less oxidizing atmosphere and at a temperature below about 1100 degrees Celsius the metal cations emerge from the spinel matrix to yield a plurality of metal particles adhering to the spinel grain or residing in intragranular pores.

15 Claims, 4 Drawing Sheets
(2 of 4 Drawing Sheet(s) Filed in Color)

REJUVENABLE CERAMIC EXHIBITING INTRAGRANULAR POROSITY

CROSS-REFERENCE TO RELATED APPLICATIONS

This application claims priority to and is a continuation-in-part of then co-pending U.S. patent application Ser. No. 13/341,972, filed on Dec. 31, 2011, now abandoned.

TECHNICAL FIELD

The novel technology relates generally to the materials science, and, more particularly, to a rejuvenable cermet catalyst material that may possess intragranular porosity, and methods for making and rejuvenating the same.

BACKGROUND

There is a plurality of fuels from which hydrogen may be produced. These fuels include, but are not limited to, hydrocarbons, oxygenated hydrocarbons, liquid fuels, water, and ammonia. The most common methods of producing hydrogen today involve the reforming of hydrocarbons in the presence of a catalyst at elevated temperatures. Steam reforming, partial oxidation and autothermal reforming are the primary methods of producing hydrogen. Alternative reactions which may be employed include the catalytic cracking of hydrocarbons, oxygenated hydrocarbons, liquid fuels, water, and ammonia.

Steam methane reforming is an endothermic process that is currently the most widely used process for producing hydrogen at an industrial scale. The primary steam reformer is typically operated at temperatures ranging from 800 to 1000 degrees Celsius. The steam methane reforming process consists of reacting methane with steam to produce a mixed stream of gases consisting of hydrogen, carbon monoxide, carbon dioxide, steam, and hydrocarbons according to

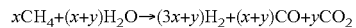

$$xCH_4 + (x+y)H_2O \rightarrow (3x+y)H_2 + (x+y)CO + yCO_2$$

It should also be noted that other feedstocks may be used as a substitute in the steam reforming process, including higher molecular weight hydrocarbons, oxygenated hydrocarbons, and liquid fuels.

Partial oxidation involves the substoichiometric combustion of the feedstock to achieve the temperatures necessary to reform the hydrocarbon fuel. Catalytic decomposition of the fuel to primarily hydrogen and carbon monoxide occurs through thermal reactions at high temperatures of about 600 degrees Celsius to about 1200 degree Celsius, and preferably, between about 700 degrees Celsius and about 1050 degree Celsius. An example of the partial oxidation reforming reaction is as follows:

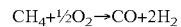

$$CH_4 + \tfrac{1}{2}O_2 \rightarrow CO + 2H_2$$

Autothermal reforming is a combination of the steam reforming and the partial oxidation reactions. The net heat of reaction for autothermal reforming is zero—that is, the heat produced by the exothermic partial oxidation reaction is fully consumed by the endothermic steam reforming reaction.

Processing or reforming of hydrocarbon fuels such as gasoline may provide an immediate fuel source, such as for the rapid start up of a fuel cell, and also protect the fuel cell by breaking down long chain hydrocarbons and removing impurities. Fuel reforming may include mixing fuel with air, water and/or steam in a reforming zone before entering the reformer system, and converting a hydrocarbon such as gasoline or an oxygenated fuel such as methanol into hydrogen ($H_2$) and carbon monoxide (CO), along with carbon dioxide ($CO_2$) methane ($CH_4$), nitrogen ($N_2$), and water ($H_2O$).

The use of a catalyst may result in acceleration of the reforming reactions and also enable the use of lower reaction temperatures than would otherwise be required in the absence of a catalyst. Typically, base metal catalysts are employed in the aforementioned processes used in industrial hydrogen production. These base metal catalysts are dispersed on the surface of a stoichiometric ceramic support. An irreversible loss in activity during operation is inevitable. During operation the catalyst performance degrades due to thermal, mechanical and/or chemical deactivation mechanisms. Examples of chemical and mechanical catalyst deactivation in hydrogen production are poisoning by sulfur chemisorption and fouling by carbon deposition (coking), respectively. Thermal deactivation mechanism include a decline in the density of catalytically active sites or dispersion (sintering) and a loss in surface area of the support (sintering & coarsening of pores) which reduces the accessibility to the active sites.

Of the aforementioned deactivation mechanisms, coking is the only truly reversible reaction for which the loss in activity is recoverable through a process known as regeneration. Regeneration involves the gasification of the carbon with hydrogen, oxygen, air, carbon dioxide or water. Removal of sulfur from the catalyst via reaction with water, hydrogen or oxygen is impractical because the high temperatures that are required cause sintering of most base metal catalysts. Lastly, sintering of base metal catalysts is an irreversible process; however, re-dispersion of noble metal catalysts is possible.

Thus, there is a need for a catalyst system that is more resistive to chemical, mechanical and thermal degradation. The present novel technology addresses these needs.

SUMMARY

The present novel technology relates generally to ceramic materials, and, more particularly, to a rejuvenable base metal catalyst system that may possess intragranular porosity. One object of the present novel technology is to provide an improved ceramic catalyst material. Related objects and advantages of the present novel technology will be apparent from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

Figure 1A:
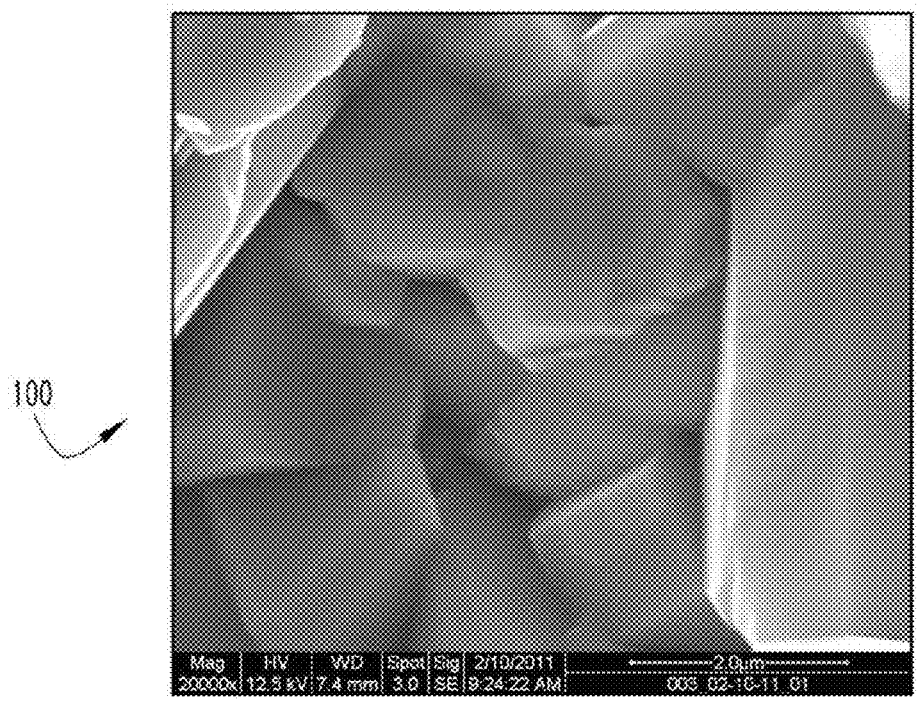
FIG. 1A is a photomicrograph of a spinel cermet composition according to a first embodiment of the present novel technology, having rejuvenable intragranular porosity when activated in a reducing environment, prior to activation.
Figure 1B:
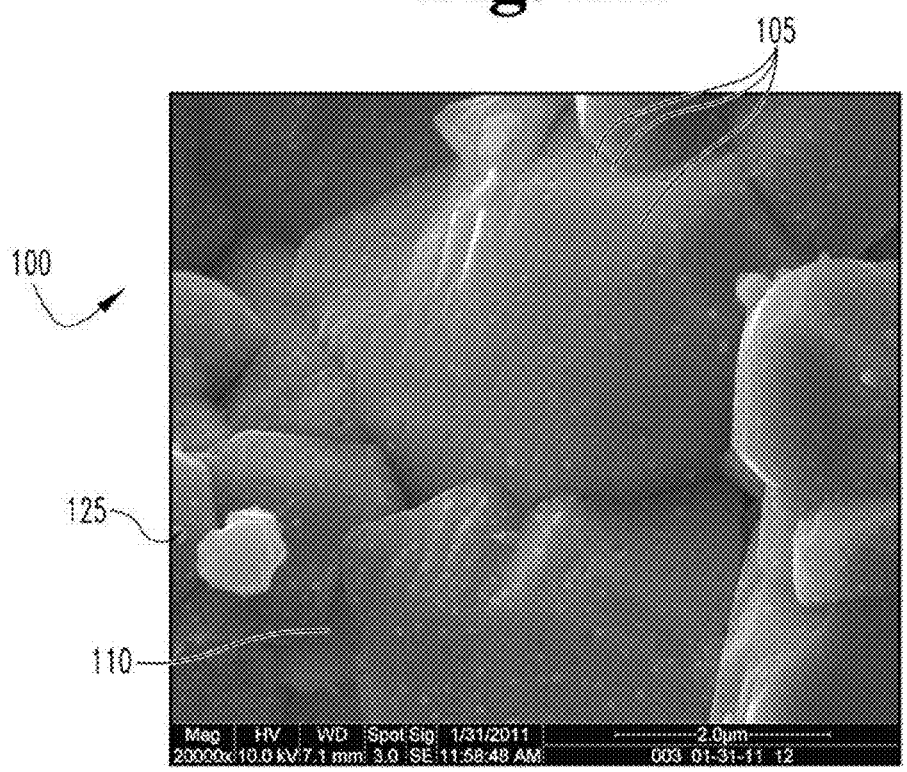
FIG. 1B is a photomicrograph of the cermet of FIG. 1A, activated in a reducing environment.
Figure 2A:
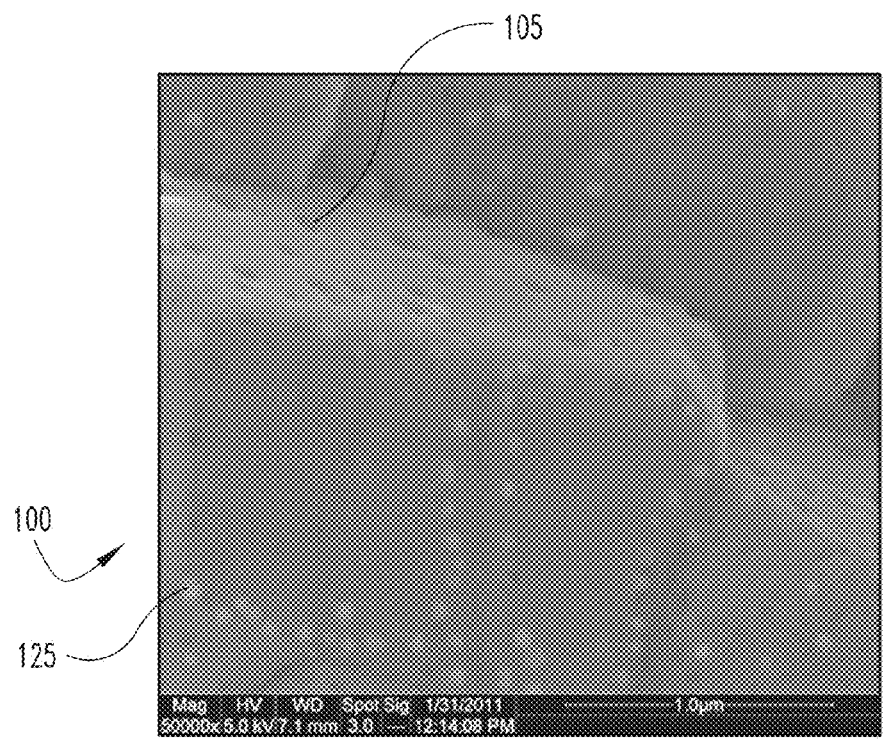
FIG. 2A is a photomicrograph of the cermet of FIG. 1B showing intragranular porosity.
Figure 2B:
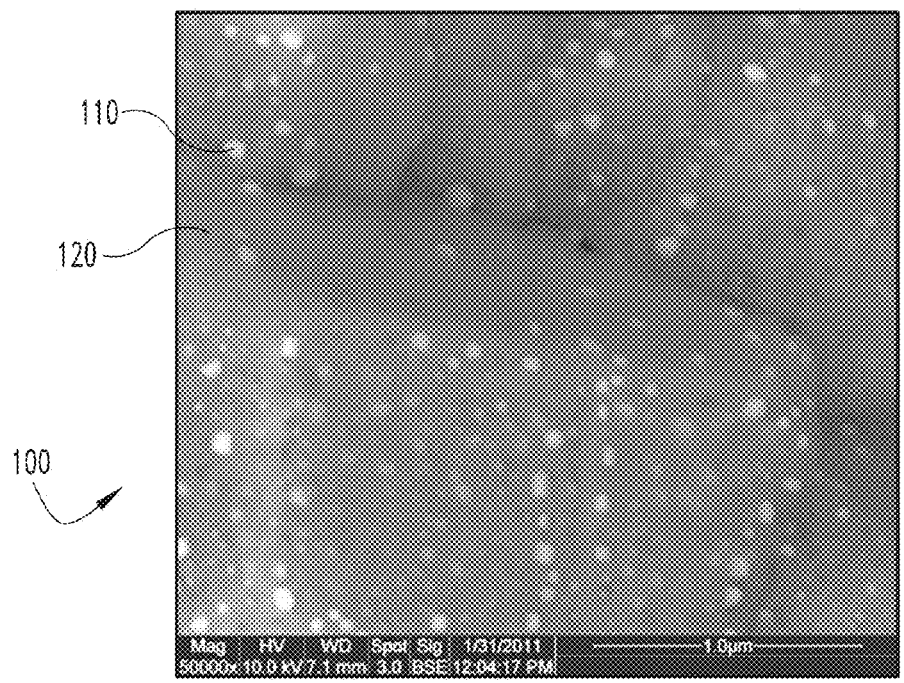
FIG. 2B is a photomicrograph of the cermet of FIG. 1B showing metal particles in the intragranular pores.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

As illustrated in FIGS. 1A-5, the present novel technology relates to a spinel compositional range wherein intragranular porosity and/or rejuvenability may be selectively activated/deactivated by cycling between oxidizing and reducing atmospheres, typically at temperatures below 1100° C. Spinels are minerals having a general formulation of $A^{2+}B_2^{3+}O_4^{2-}$ and crystallize in the cubic (isometric) crystal system. The oxide anions are arranged in a cubic close packed (CCP) lattice structure and the A and B cations occupy some or all of the octahedral and tetrahedral sites. The A and B cations may be divalent, trivalent, or tetravalent, and are typically selected from the group including aluminum, chromium, iron, magnesium, manganese, silicon, and zinc. Although the anion is normally oxygen, the anion may also be selected from the chalcogenides to yield the thiospinel structure. The A and B cations may also be the same metal under different charges, such as the case in $Fe_3O_4$ (as $Fe^{2+}Fe_2^{3+}O_4^{2-}$). The spinel group includes aluminum spinels, such as Spinel ($MgAl_2O_4$), Gahanite ($ZnAl_2O_4$), and Hercynite ($FeAl_2O_4$), iron spinels, such as Magnetite ($Fe_3O_4$) and Trevorite ($NiFe_2O_4$), chromium spinels, such as Chromite ($FeCr_2O_4$), and others.

Figure 3A:
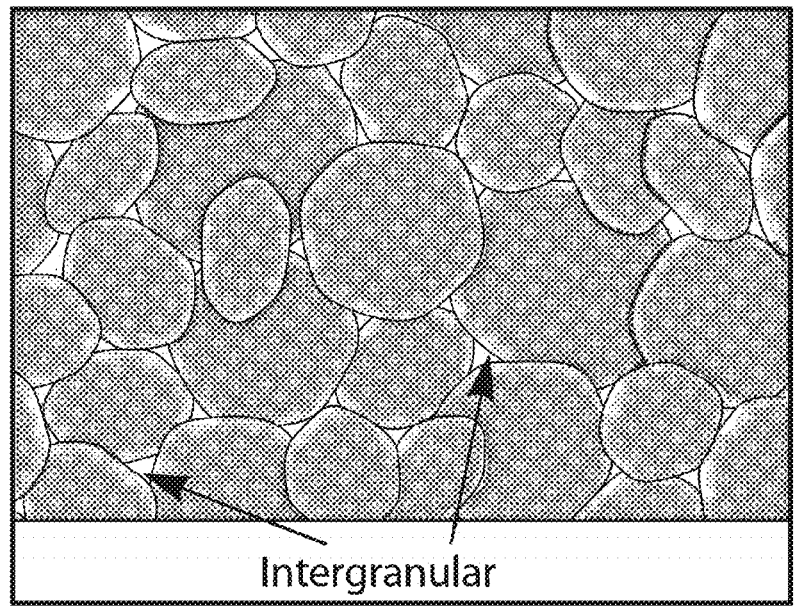
FIG. 3A graphically illustrates a prior art spinel catalyst composition having intergranular pores.

Conventional ceramic catalyst supports exhibit intergranular porosity that is formed prior to the activation procedure (see FIG. 3A). In the novel composition 100, intragranular pores 105 may be cyclically opened and closed (illustrated in FIGS. 2A-B, 4 and 5). The extent to which these physical and/or chemical reactions proceed may be mediated or controlled by variations in the spinel composition, the environmental oxygen partial pressure and/or the temperature of the spinel composition. The novel cermet 100 is well suited for catalytic applications because the intragranular pores 105 stabilize the metal particles 110, i.e. the pores 105 prevent the metal particles 110 from growing in size. The average metal crystallite 110 size is on the same order of magnitude as the size of the intragranular pore 105.

For the intended use of these materials, the products 105, 110 of the reduction reaction (the activation procedure) may be cycled into, upon oxidation, and out of, upon re-activation, the spinel support 100. The reversible reaction that describes this rejuvenation process enables the re-sorption and re-dispersion of the base metal catalyst 110 thus maintaining or recovering its original size upon subsequent regeneration/rejuvenation cycles.

Synthesis of the Precursor

A precursor oxide is formed by heating the batch components to form a spinel. The exact route of synthesis is immaterial because some compositions may be formed in inert atmospheres, slightly reducing atmospheres, air and oxidizing atmospheres and the temperature range of the synthesis is dependent on the desired spinel composition. The batch components include a combination of divalent (A) and trivalent (B) cations such as: Al, Ca, Cr, Co, Cu, Fe, Mg, Mn, Ni, Ti, and Zn, and may even include small amounts of lighter elements such as Li, Na, and K and the like.

The precursor oxide is typically heated in an inert or reducing atmosphere, such as $N_2$, He, $H_2$, $CH_4$, CO, or the like, to form a ceramic-metal (a "cermet") composite 100. Typically, the oxygen partial pressure during activation is lower than the oxygen partial pressure used for the synthesis of the precursor. The cermet 100 includes a plurality of metal particles 110, typically between a few nanometers to a few hundred nanometers across, dispersed throughout a spinel matrix 100. The spinel phase exhibits intragranular pores 105, typically having a size of between about a few nanometers to about 50 nanometers across. The metal particles 110 typically reside at the surface of the spinel grain, at the grain boundaries, and within the intragranular pores 105 (see FIG. 2). The metal particles 110 at the surface of the grain typically have a larger average particle size than the metal particles 110 that reside within the intragranular pores 105.

The temperature at which the cermet forms is typically a function of the composition of the precursor and the atmosphere used for activation. The composition of the cermet 100 is a function of the activation conditions (temperature, oxygen partial pressure and time). Activation of the precursor material may be achieved in service. Application of the instant technology in the form of the precursor material in a reducing environment may be sufficient to activate the material for use in hydrogenation and dehydrogenation reactions, i.e. it is not necessary to activate the catalyst externally prior to its application or sale.

For compositions, having at least one $B^{3+}$ reducible specie, intragranular porosity 105 is rendered upon activation, the final step that is required to prepare the catalyst for service. This type of porosity is projected to be less prone to collapse than intergranular porosity. Typically, intergranular porosity is engineered into a commercial catalyst support prior to activation, and this porosity collapses and coarsens (grows in size) leading to an irreversible loss in surface area during activation, operation and regeneration. This loss in surface area results in a lower activity. The direct benefits of the intragranular porosity are less catalyst is required to maintain the same yields and the catalyst lifetime is prolonged which effects fewer plant interruptions.

Figure 3B:
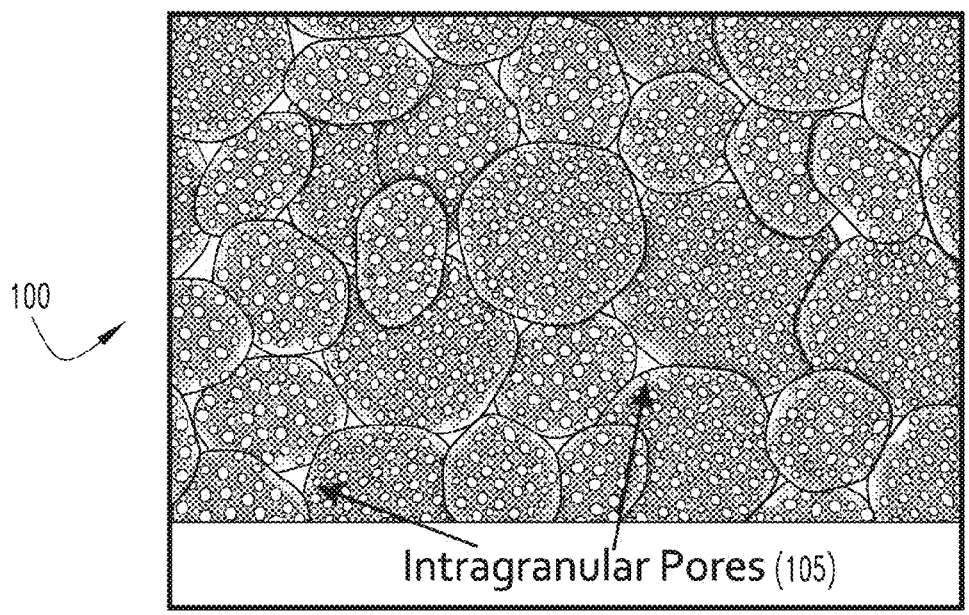
FIG. 3B graphically illustrates the cermet of FIG. 1B in a reducing environment having activated intragranular pores.

Conventional ceramic supports exhibit intergranular porosity that is formed prior to the activation procedure. In this novel technology, intragranular pores form upon activation. Herein, rejuvenation refers to the ability to cycle the metal into and out of the support upon oxidation and activation, respectively. For conventional catalysts, the metal does not cycle into and out of the ceramic support—the metal partially oxidizes at the metal-ceramic interface but typically this interaction is considered to be undesirable. Oxidation of a conventional catalyst results in the formation of a metal oxide on a ceramic support—the composition of which is mostly constant. An illustration of a conventional catalyst in the precursor/oxidized and activated/reduced forms is shown in FIGS. 3A-B.

Figure 4:
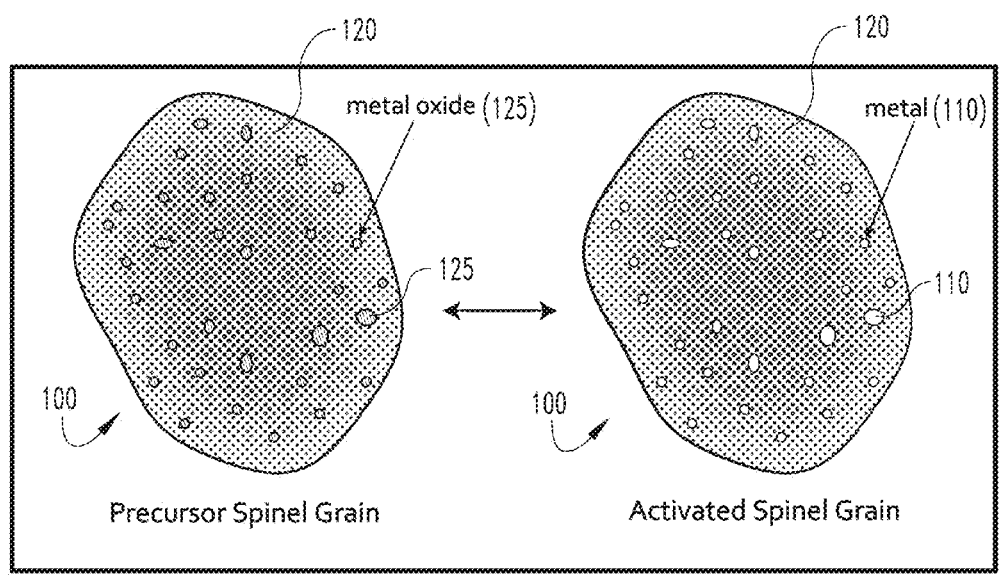
FIG. 4 graphically illustrates the spinel cermet of FIG. 1B having a distributed second spinel phase transitioning between a preactivated state in an oxidizing environment and an activated state in a reducing environment with distributed metal particles.
Figure 5:
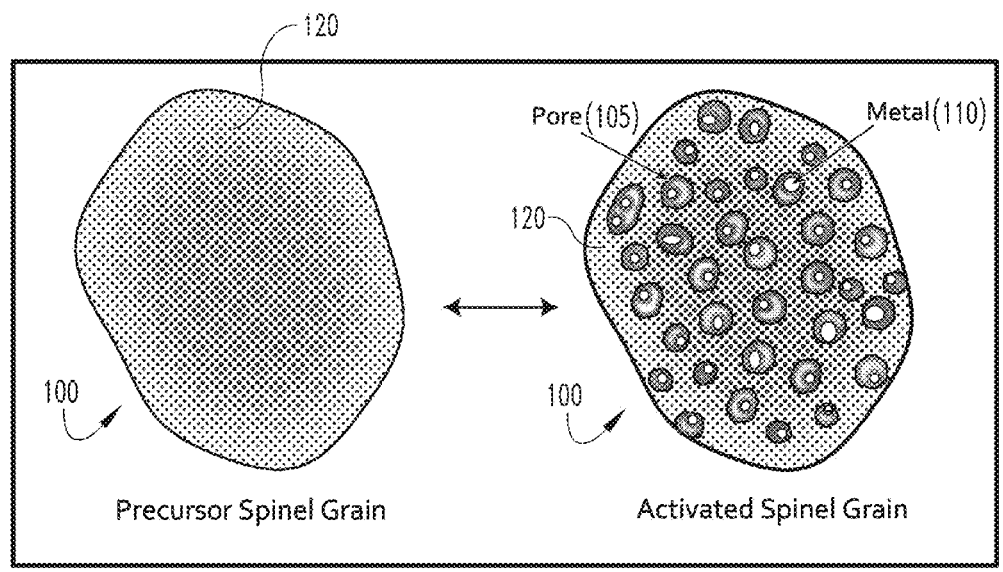
FIG. 5 graphically illustrates the spinel cermet of FIG. 1B having a distributed second spinel phase transitioning between a preactivated state in an oxidizing environment and an activated state in a reducing environment with intragranular pores having metal particles positioned therein.

FIGS. 2A-B, 4 and 5 illustrate recovery of intragranular porosity 105 and metal particle size. During use at high temperatures and/or in steam, porosity in conventionsl catalyst spinels tends to collapse and/or to coarsen over time, and the metal particles likewise coarsen (grow in size). This degradation leads to a lower surface area of both the metal and ceramic phases. In the novel cermet 100, the activated catalyst 110 is re-oxidized at temperatures exceeding the activation temperature, the reducible species "resorb" back into the spinel grain 100 to yield the initial precursor spinel phase 125. Upon subsequent activation, the intragranular porosity regenerates and the metal dispersion returns to a "fresh" state. The term fresh is commonly used to describe a catalyst that has not been used in service. From a catalysis perspective, another way to describe the advantages of rejuvenation is the ability of the cermet material 100 to cycle from a spent state back to a fresh state. In the instant cermet material 100, the catalyst oxidizes to form a metal oxide 125 that readily resorbs into the support 100 to yield a spinel 125 that is compositionally different from the activated form. An illustration of a precursor spinel grain having the composition 'X' and the activated "cermet" having the composition of a metal on 'Y' spinel are shown in FIGS. 4 and 5.

The following describes the precursor spinel compositions, where A is a divalent cation and B is a trivalent cation:

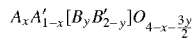

A & B are reducible species and A' & B' are non-reducible species. A typically includes Co, Cu, Fe, Ni and combinations thereof, while B typically includes Co, Fe, Mn, and combinations thereof. A' typically includes Mg, Mn, Zr and combinations thereof, while B' typically includes Al, Cr, and combinations thereof. The spinel composition may contain more than one reducible divalent and trivalent species, and/or more than one non-reducible divalent and trivalent species. The spinel composition typically contains at least one non-reducible divalent and one non-reducible trivalent specie to prevent complete decomposition of the spinel phase. Typically, the precursor spinel composition has x and y respective moles of reducible $A^{2+}$ & $B^{3+}$ species, where 0.25 is less than or equal to $(1-x+y)/(2-y)$, and where $(1-x+y)/(2-y)$ is less than 0.44, and where $(1-x+y)/(2-y)$ is greater than 0.52 and where $(1-x+y)/(2-y)$ is less than or equal to 0.60. More typically, x and y are both nonzero numbers less than 1. Upon activation (reduction), it is possible to yield a cermet 100 composed of $A^0$, $(A,B)^0$ and/or $B^0$ metals and alloys. These are simply examples, as the alloys may be comprised of more than 2 elements.

For some combinations x & y, it is possible to yield A'O and/or BO as an additional product(s) of the reduction reaction (activation). Intragranular porosity is typically most easily observed when the precursor composition contains both $A^{2-}$ & $B^{3+}$ reducible species.

In the instant cermet 100, promoters such as $Li_2O$, $Na_2O$ and $K_2O$ are soluble in the precursor spinel phase prior to and following activation.

Example Compositions
Only A is Reducible:
  For lower Fe contents: $(Fe,Mn,Mg)[Al]_2O_4 \rightarrow Fe+$ spinel
Only B is Reducible:

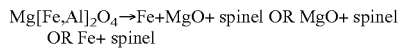

Both A & B are Reducible:

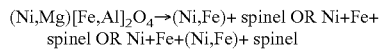

Both intragranular porosity 105 and rejuvenability have been observed using scanning electron microscopy, X-ray diffraction, and $N_2$ adsorption/desorption isotherms. The intragranular porosity and metal dispersion were observed in micrographs. The compositional range was determined from X-ray diffraction data and thermogravimetric data. The $N_2$ adsorption/desorption data shows the formation of mesoporosity as the cermet material 100 cycles between the precursor and activated state.

The superior performance of the catalyst 100 is implied from the thermal stability of the intragranular porosity 105, dispersion of the metal 110, and the composition of the metal 110. The intended applications for these materials include any hydrogenation or dehydrogenation reaction. These reactions include but are not limited to the decomposition of hydrocarbons into mixtures of carbon, carbon oxides, hydrogen, water, and/or lighter hydrocarbons, steam reforming of hydrocarbons, and the partial oxidation of hydrocarbons.

Solutions Offered:
(1) Superior stability of the metal catalyst wherein the dispersion of the metal catalyst is recoverable upon successive regeneration cycles
(2) Superior stability of the catalyst support porosity wherein the intragranular porosity of the spinel phase is more stable than intergranular porosity.
(3) The surface area of the intragranular porosity and/or metal catalyst may be recovered, i.e. the effects of thermal degradation are reversible.
(4) A spinel support wherein a metallic catalyst may be absorbed into and desorbed out of the spinel support without producing additional solid decomposition products.
(5) A spinel containing metal cations one or more of which may be oxidized and/or reduced without undergoing a phase transformation at temperatures less than 1100 degrees Celsius.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:
1. A catalyst obtained by:
a) preparing a spinel with the general formula $A_xA'_{1-x}[B_yB'_{2-y}]O_4$,
  wherein A is selected from the group consisting of Co, Cu, Fe, Ni and combinations thereof;
  wherein A' is Mn, of which up to two-thirds may be replaced by Mg, Zn and combinations thereof;
  wherein B is selected from the group consisting of Co, Fe, Mn, and combinations thereof;
  wherein B' is selected from the group consisting of Al, Cr, and combinations thereof;
  wherein x and y are nonzero numbers less than 1 and represent the respective moles of A and B species;
  wherein 0.25 is less than or equal to $(1-x+y)/(2-y)$; and
  wherein $(1-x+y)/(2-y)$ is less than 0.44; and wherein

(1−x+y)/(2−y) is greater than 0.52 and wherein (1−x+y)/(2−y) is less than or equal to 0.60; and b) activating the spinel in a reducing atmosphere to yield metal particles dispersed within and/or on the spinel.

2. The catalyst of claim 1 wherein the metal particles have a composition selected from the group comprising A, B, and (A, B).

3. The method of claim 1 wherein the reducing atmosphere is hydrogen at temperatures between 800 and 1100 degrees Celsius.

4. The method of claim 1 wherein the activated catalyst may be oxidized at temperatures between 800 and 1100 degrees Celsius to yield the spinel.

5. A cermet catalyst material, comprising:
a spinel matrix defining at least one spinel grain; and
a plurality of metal particles at least partially embedded the at least one spinel grain;
wherein the spinel has a general formula

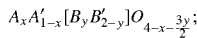

wherein A is selected from the group including Co, Cu, Fe, Ni and combinations thereof;
wherein A' is selected from the group including Mg, Mn, Zn and combinations thereof;
wherein B is selected from the group including Co, Fe, Mn, and combinations thereof;
wherein B' is selected from the group including Al, Cr, and combinations thereof;
wherein when the at least one spinel grain is in a first oxidizing atmosphere and at a temperature above about 800 degrees Celsius the metal particles are absorbed into the spina matrix in the form of metal cations; and
wherein when the at least one spinel grain is in a reducing atmosphere and at a temperature between about 700 degrees Celsius and about 1100 degrees Celsius the metal cations emerge from the spinel matrix to yield a plurality of metal particles at least partially embedded in the at least one spinel grain.

6. The cermet catalyst material of claim 4 wherein the spinel matrix defines a plurality of spinel grains, and wherein the plurality of spinel grains are sintered together to define a spinel body.

7. The cermet catalyst material of claim 4 wherein the metal particles are between 1 nanometer and 100 nanometers across and wherein the metal particles are generally positioned at grain boundaries, grain surfaces and in intragranular pores.

8. The cermet catalyst material of claim 4 wherein 0.25 is less than or equal to (1−x+y)/(2−y); and wherein (1−x+y)/(2−y) is less than 0.44; and wherein (1−x+y)/(2−y) is greater than 0.52 and wherein (1−x+y)/(2−y) is less than or equal to 0.60; and wherein x and y represent the respective moles of A and B species.

9. A method for preparing a spinel cermet material, comprising:
mixing trivalent cations with divalent cations to define an admixture;
heating the admixture to yield a plurality of spinel grains defining a spinel matrix; and
generally evenly dispersing metal particles throughout the spinel matrix;
wherein the metal particles are positioned at grain boundaries, grain surfaces and in intragranular pores;
wherein the spinel matrix has a general formula

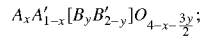

wherein A is selected from the group including Co, Cu, Fe, Ni and combinations thereof;
wherein A' is selected from the group including Mg, Mn, Zn and combinations thereof;
wherein B is selected from the group including Co, Fe, Mn and combinations thereof;
wherein B' is selected from the group including Al, Cr and combinations thereof; and wherein x and y are both nonzero numbers less than 1;
wherein reducible metal cations may be absorbed into the spina structure at elevated temperatures in an atmosphere having a first oxygen partial pressure.

10. The method of claim 8 wherein absorbed metal cations are desorbed from the spinel structure upon exposure to elevated temperatures in an atmosphere having a second, lower oxygen partial pressure.

11. The method of claim 8 wherein 0.25 less than or equal to (1−x+y)/(2−y); and wherein (1−x+y)/(2−y) is less than 0.44; and wherein (1−x+y)/(2−y) is greater than 0.52 and wherein (1−x+y)/(2−y) is less than or equal to 0.60;
wherein x and y represent the moles of A and B species, respectively.

12. A cermet catalyst material, comprising:
a spinel matrix defining a spinel grain; and
a plurality of metal particles embedded in or on the spinel grain;
wherein when the spinel grain is in a environment the metal particles are absorbed into the spinel matrix in the form of metal cations;
wherein the first environment is defined as having an oxidizing atmosphere and a temperature in excess of about 800 degrees Celsius;
wherein when the spinel grain is in a second environment the metal cations emerge from the spinel matrix to yield a plurality of metal particles adhering to the spinel grain;
wherein the second environment is defined as having non-oxidizing atmosphere and at a temperature between about 600 and 1100 degrees Celsius,
wherein the spinel has a general formula $A_xA'_{1-x}[B_yB'_{2-y}]O_{4-x-(3y/2)}$;
wherein A is selected from the group consisting of Co, Cu, Fe, Ni and combinations thereof;
wherein A' is selected from the group consisting of Mg, Mn, Zn and combinations thereof;
wherein B is selected from the group consisting of Co, Fe, Mn, and combinations thereof;
wherein B' is selected from the group consisting of Al, Cr, and combinations thereof;
wherein x and y represent the respective moles of respective A and B species;
wherein the composition includes A, A', B and B' species; and
wherein 0.25 is less than or equal to (1−x+y)/(2−y); and wherein (1−x+y)/(2−y) is less than 0.44; and wherein (1−x+y)/(2−y) is greater than 0.52 and wherein (1−x+y)/(2−y) is less than or equal to 0.60.

13. The cermet catalyst material of claim 11 wherein the metal particles have a composition of A, B, and/or (A, B).

14. The cermet catalyst material of claim 11 wherein A' and B species may desorb from the spinel matrix in the form of A'O, BO, or (A', B)O and combinations thereof.

15. A catalyst material, comprising:

a spinel matrix defining a spinel grain; and a plurality of metal particles embedded on the spinel grain;

wherein when the spinel grain is in a first oxidizing environment at a temperature above 800 degrees Celsius the metal particles are absorbed into the spinel matrix in the form of metal cations;

wherein when the spinel grain is in a second less oxidizing environment at a temperature between 600 degrees Celsius and 1100 degrees Celsius the metal cations emerge from the spinel matrix and to form a plurality of metal particles adhering to the spinel grain;

wherein the spinel has a general formula $$A_x A'_{1-x} [B_y B'_{2-y}] O_{4-x-\frac{3y}{2}};$$

wherein A is selected from the group consisting of Co, Cu, Fe, Ni and combinations thereof;

wherein A' is selected from the group consisting of Mg, Mn, Zn and combinations thereof;

wherein B is selected from the group consisting of Co, Fe, Mn, and combinations thereof;

wherein B' is selected from the group consisting of Al, Cr, and combinations thereof;

wherein x and y represent the respective moles of A and B species;

wherein the spinel grain includes A, A', B and B' species; and wherein 0.25 is less than or equal to $(1-x+y)/(2-y)$; and wherein $(1-x+y)/(2-y)$ is less than 0.44; and wherein $(1-x+y)/(2-y)$ is greater than 0.52 and wherein $(1-x+y)/(2-y)$ is less than or equal to 0.60.

* * * * *